Dec. 26, 1944.  H. W. KOST  2,366,114
METHOD OF FORMING SCREW-RECEIVING FASTENERS
Original Filed Jan. 31, 1942
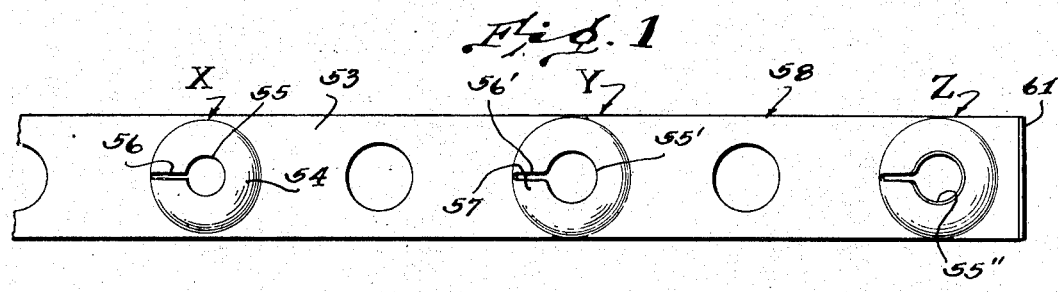
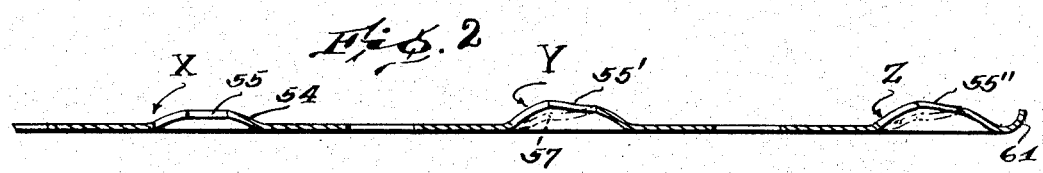
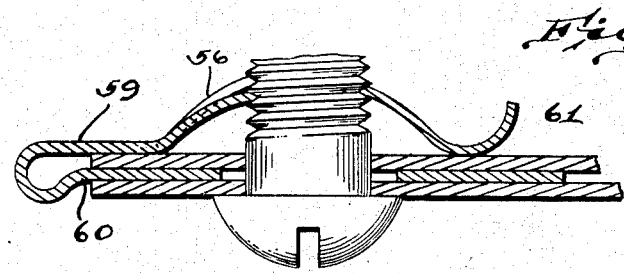
Harold W Kost
INVENTOR.
BY Malcolm W Fraser
ATTORNEY Patented Dec. 26, 1944

2,366,114

UNITED STATES PATENT OFFICE 2,366,114

METHOD OF FORMING SCREW-RECEIVING FASTENERS

Harold W. Kost, Birmingham, Mich., assignor to Detroit Harvester Company, Detroit, Mich., a corporation of Michigan Original application January 31, 1942, Serial No. 429,030. Divided and this application April 16, 1943, Serial No. 483,231

2 Claims. (Cl. 29—148)

This invention relates to fasteners and particularly to the method of forming fastening devices of sheet material such as sheet metal, such devices being adapted to receive a screw-threaded member.

An object is to produce a new and improved method of forming a fastening device of the above character whereby the screw thread receiving aperture is more nearly round so that when the screw is tightened, the fastener will bite into the root of the thread substantially throughout its circumference and thereby a more secure and reliable connection or fastening is effected.

Another object is to produce a method of forming fasteners of the above character which lends itself particularly to large scale production and insures the manufacture more uniformly of satisfactory fasteners.

Other objects and advantages of the invention reside in the particular steps and sequence of steps hereinafter more fully described and for purposes of illustration but not of limitation, an embodiment of the invention is shown on the accompanying drawing in which Figure 1 is a top plan view of a sheet metal strip showing in sequence the three steps employed in the production of a fastener which is particularly adapted to receive machine screws;

Figure 2 is a longitudinal sectional view of the fastener strip shown on Figure 1; and Figure 3 is an enlarged longitudinal sectional view of a fastener as ultimately produced from the strip according to Figures 1 and 2, the same being applied to a supporting panel to which another panel is secured by a screw passing through aligned openings in the panels.

The illustrated embodiment of the invention comprises a strip 53 of sheet metal or other suitable sheet material on which are illustrated forms X, Y and Z which show successive steps employed in the manufacture of the fastening device. In the step X, a protuberance 54 has upwardly sloping sides, a round hole 55 in the central portion thereof and a slit 56 extending from the hole 55 to the base of the protuberance. In the form Y which is the next succeeding step, the slot 56' is enlarged as also the hole 55'. Likewise the side 57 of the slit 56' is pressed downwardly toward the plane of the strip 53 thereby to form the edge of the hole 55' into the form of a helix. In the final operation as exemplified by form Z, the size of the hole 55'' is slightly reduced, the metal at the edge of the hole being thinned slightly in order to extend well between the threads of the screw toward the root thereof. It will be understood that the steps above described are carried out by dies and in the final step Z, the dies are so designed as to remove sharp burrs and to insure that the corners at the upper end of the slot are rounded to prevent cutting into the threads of the screw.

In the final step in forming the fastener shown in Figure 3, the strip is severed transversely in about the region 58 and then bent to form an upper arm 59 and a lower arm 60. It will be observed that the advanced edge of the strip is curved upwardly as indicated at 61 to facilitate in the application of the fastener as will be readily understood. In this fastener it will be manifest that the finally developed hole is round with the edge wall thereof disposed at substantially right angles to the plane of the sheet or strip. Due to the thinness of the metal and the method of forming the fastener, it is particularly adapted to receive machine screws.

It will be manifest from the above description that these fasteners may be produced speedily and at a relatively low cost. The method is particularly adapted for large volume production in which many thousands of these fasteners can be produced daily. The steps are so designed that fasteners can be produced of substantially uniform character, each fastener being virtually identical with the one previously formed. It is to be understood that the invention is not limited to the production of a fastener such as illustrated on Figure 3, inasmuch as it may assume numerous other forms depending upon the use for which the fastener is intended.

This application constitutes a division of my co-pending application Serial No. 429,030, entitled "Method of forming fastening devices."

It is to be understood that numerous changes in the choice of materials and operation may be effected without departing from the spirit of the invention especially as defined in the appended claims.

What I claim is:

1. In the method of forming a sheet metal structure or element for self-locking engagement by a screw the steps which comprise pressing a dome-like protuberance out of the normal plane of the sheet and at the same time punching out a round hole in the top of the protuberance and punching out a slit extending radially from the round hole to the base of the protuberance, subsequently enlarging the slit and pressing the metal at one side of the slit in a direction toward the sheet and enlarging the hole substantially to roundness in plan view so that a portion of the wall of the opening is formed into the inner or lower portion of a helix which extends progressively and uniformly to the outer or higher portion of the helix, and subsequently reducing the thickness of metal at the edge of the hole as well as the size of the developed hole to provide a thread.

2. In the method of forming a fastening device for self-locking engagement by a screw the steps which comprise: providing relatively thin sheet material thicker than the finished thread in engaging portions, pressing a dome like protuberance out of the normal plane of the material and simultaneously punching out a round hole in the top of the protuberance as well as punching out a slit extending radially from the round hole to the base of the protuberance, enlarging both the slit and the hole, pressing the metal at one side of the slit in a direction toward the sheet so that the edge portion of the opening is formed into a helix extending progressively and uniformly from the lower portion to the higher portion of the helix, and pressing the sheet material in the region of the thread engaging edge portion of the hole thereby to reduce the thickness of the material in that region and also to reduce the size of the developed hole and removing the burrs and rounding the corners of the slot.

HAROLD W. KOST.